US008566698B1

(12) United States Patent
Zubizarreta et al.

(10) Patent No.: US 8,566,698 B1
(45) Date of Patent: Oct. 22, 2013

(54) DOCUMENT MANAGEMENT SYSTEM AND METHOD

(75) Inventors: Miguel Zubizarreta, Westlake, OH (US); Thomas Dial, Lakewood, OH (US)

(73) Assignee: Hyland Software, Inc., Westlake, OH (US)

( * ) Notice: Subject to any disclaimer, the term of this patent is extended or adjusted under 35 U.S.C. 154(b) by 0 days.

(21) Appl. No.: 10/378,288

(22) Filed: Mar. 3, 2003

Related U.S. Application Data

(60) Provisional application No. 60/362,105, filed on Mar. 5, 2002.

(51) Int. Cl.
*G06F 17/00* (2006.01)
(52) U.S. Cl.
USPC ............................ 715/221; 715/222; 715/223
(58) Field of Classification Search
USPC ...................................... 715/500, 505–8, 513
See application file for complete search history.

(56) References Cited

U.S. PATENT DOCUMENTS

| | | | | |
|---|---|---|---|---|
| 5,566,330 A | * | 10/1996 | Sheffield | 707/4 |
| 6,035,324 A | * | 3/2000 | Chang et al. | 709/203 |
| 6,457,879 B1 | * | 10/2002 | Thurlow et al. | 709/206 |
| 6,594,682 B2 | * | 7/2003 | Peterson et al. | 718/102 |
| 6,714,928 B1 | * | 3/2004 | Calow | 707/4 |
| 6,895,430 B1 | * | 5/2005 | Schneider | 709/217 |
| 2002/0007321 A1 | * | 1/2002 | Burton | 705/26 |
| 2002/0055878 A1 | * | 5/2002 | Burton et al. | 705/26 |
| 2002/0083145 A1 | * | 6/2002 | Perinpanathan | 709/213 |
| 2002/0087479 A1 | * | 7/2002 | Malcolm | 705/64 |
| 2003/0158947 A1 | * | 8/2003 | Bloch et al. | 709/227 |

OTHER PUBLICATIONS

Hyland Software, Inc., OnBase: Today's News, Mar. 1, 2001, Hyland Software, Inc., p. 1.*
OnBase® Product White Paper, Jan. 31, 2002, Hyland Software, Inc., pp. 1-56.*

* cited by examiner

*Primary Examiner* — Nathan Hillery
(74) *Attorney, Agent, or Firm* — Jones Day

(57) ABSTRACT

A system and method for document management for processing forms on a personal computer while isolated from a network. The forms may be Hypertext Markup Language (HTML) forms stored on a personal computer isolated from a network. The forms have data fields for data submission. Data is input into a selected form and a submit command is executed to submit the entered data. Execution of the submit command stores the data to a file on the personal computer. Once the personal computer is connected to the network, the stored data is sent to a central computer connected to the network.

17 Claims, 15 Drawing Sheets

US 8,566,698 B1

DOCUMENT MANAGEMENT SYSTEM AND METHOD

CROSS-REFERENCE TO RELATED APPLICATION

This application claims priority to U.S. provisional application Ser. No. 60/362,105 (entitled "Document Management System And Method" filed Mar. 5, 2002). By this reference, the full disclosure, including the drawings, of U.S. provisional application Ser. No. 60/362,105 is incorporated herein.

TECHNICAL FIELD

The present invention relates generally to document management systems and more particularly to computer-implemented processes that provide documents for storage in document management systems.

BACKGROUND AND SUMMARY

Document management systems operate on central computer server systems to aid users in properly storing electronic business form data. However, difficulty arises when personal computers try to collect data while isolated from the central servers. Additional difficulty arises when the personal computers attempt to integrate the collected data with the central servers' document management systems. To overcome these and other difficulties, a system and method for document management are provided for processing forms on a personal computer while isolated from a network. The forms are illustratively Hypertext Markup Language (HTML) forms stored on a personal computer isolated from a network. The forms have data fields for data submission. Data is input into a selected form and a submit command is executed to submit the entered data. Execution of the submit command stores the data to a file on the personal computer. Once the personal computer is connected to the network, the stored data is sent to a central computer connected to the network.

DETAILED DESCRIPTION

Figure 1:
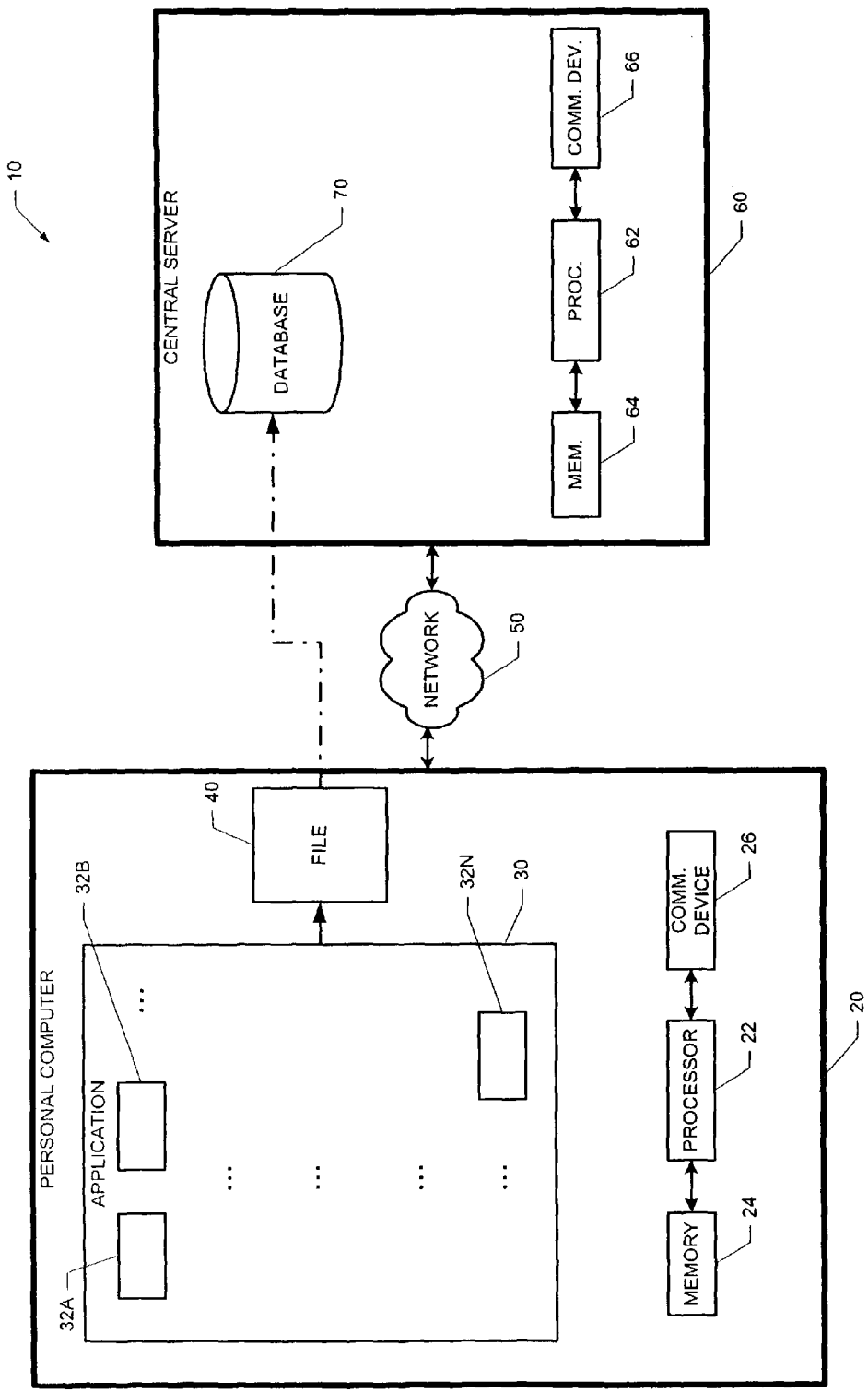
FIG. 1 is a block diagram depicting software and computer components utilized in a mobile forms system.

FIG. 1 shows a mobile forms system 10 which allows a user to create new business forms (32A, 32B, 32N) on a personal computer 20 while disconnected from a corporate network 50, and later to upload these forms (32A, 32B, 32N) to a central server 60. An application 30 operating on the personal computer 20 stores the completed forms (32A, 32B, 32N) in a local repository 40 in a self-contained manner. At a later time, when the user's computer 20 is connected to a network 50, the user uploads the completed forms (32A, 32B, 32N) to the central server 60, where they are transferred to a document management system.

Under normal circumstances, when the upload process from the personal computer 20 to the central server 60 is completely successful, the copies of the forms (32A, 32B, 32N) in the local repository 40 are deleted. In cases where the upload process is completely or partially unsuccessful, the forms that could not be uploaded remain in the user's local repository 40.

The personal computer 20 shown in FIG. 1 has a processing device 22 and a memory device 24. The personal computer 20 also includes a communication device 26 so that it may communicate with remote computer systems, such as the central server 60. The central server 60 includes one or more processing devices 62, memory devices 64 and communication devices 66. The central server 60 also has access to a database 70 that stores the form data.

The system 10 may interface with a wide variety of commercial web server applications and document management systems, such as the application marketed under the name "OnBase." The OnBase web server application is available from Hyland Software, Inc., 28500 Clemens Road, Westlake, Ohio, 44145, and serves only as an example of a document repository system that may utilize the present system.

Figure 2:
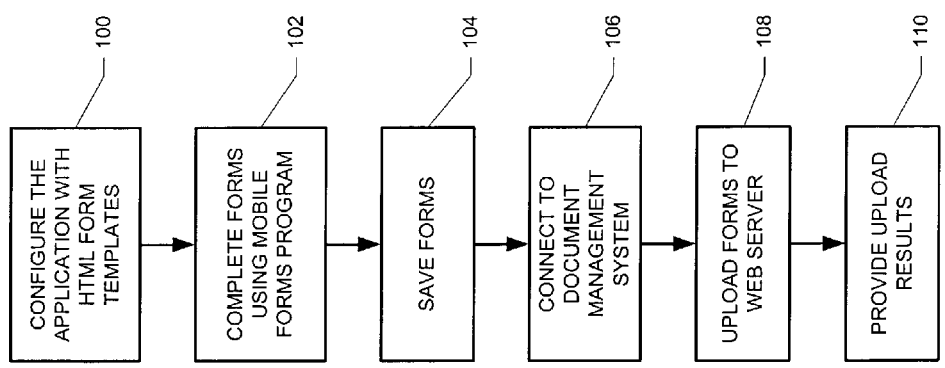
FIG. 2 is a flow chart depicting a scenario for utilizing a mobile forms system in conjunction with a document management system.

FIG. 2 provides an exemplary scenario utilizing a mobile forms system. In this scenario, the user configures the application with HTML form templates at process block 100. These may be standard HTML forms with possibly one or more document management specific fields which are used to identify the documents in the master document management system. The document management specific fields identify keywords (that can be used to search for documents once in the master system) and the document type, which uniquely identifies a form's type in the master system.

Using the mobile forms program, a user in the field completes the forms at process block 102. The act of saving a form at process block 104 causes the mobile forms program to gather the entered data (known as HTML Post Data) and save it to a self-contained file on their local system. Each of these files represents a business document or some other document related to a user's activity.

When the user is ready to upload the forms to the document management system, the user connects the personal computer to document management system (such as through a corporate network) at process block 106 and begins a synchronization process at process block 108. At this time, the mobile forms program scans a preselected directory (e.g., a "Complete Forms" directory) on the user machine in order to identify the documents that will be sent to the server. This stream is sent to the master server via a standard HTTP request. A document management system web server at the master site processes the incoming request, and decodes the single stream back into individual document files. The master server then archives each document that was submitted in this fashion.

At process block 110, the master web server responds to the mobile forms program with a message indicating which forms were properly archived into the system. Forms that were successfully imported in the document management system are then removed from the 'Completed Forms' folder on the user machine. If, for any reason, a form document could not be archived, it remains in the "Completed Forms" folder until it can be uploaded successfully.

Figure 3:
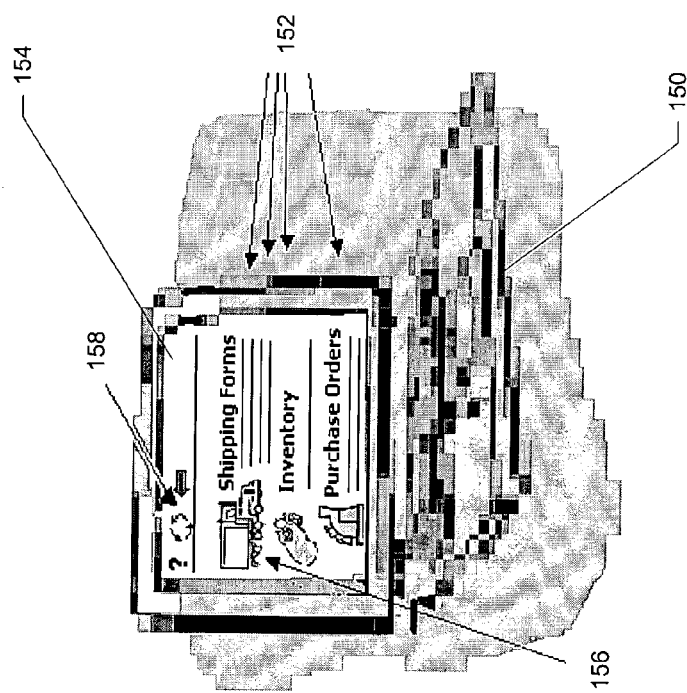
FIGS. 3-5 show remote forms screens displayed on a personal computer.

FIG. 3 shows an example of one type of personal computer 150 (e.g., a laptop computer) containing the remote forms program. However, it should be understood that many different types of personal computers may utilize the mobile forms system. For example, data may be entered from a remote location using a portable computer (e.g., notebook computer, hand-held computer, etc.) on forms that have been configured to be compatible with the forms resident on a central database.

For convenience of the user, one or more forms 152 on the personal computer 150 may be accessed from a remote forms manager screen 154, which can be configured to appear on system startup. Icons 156 are associated with forms 152 to assist the user in determining what forms 152 perform what operations.

Figure 4:
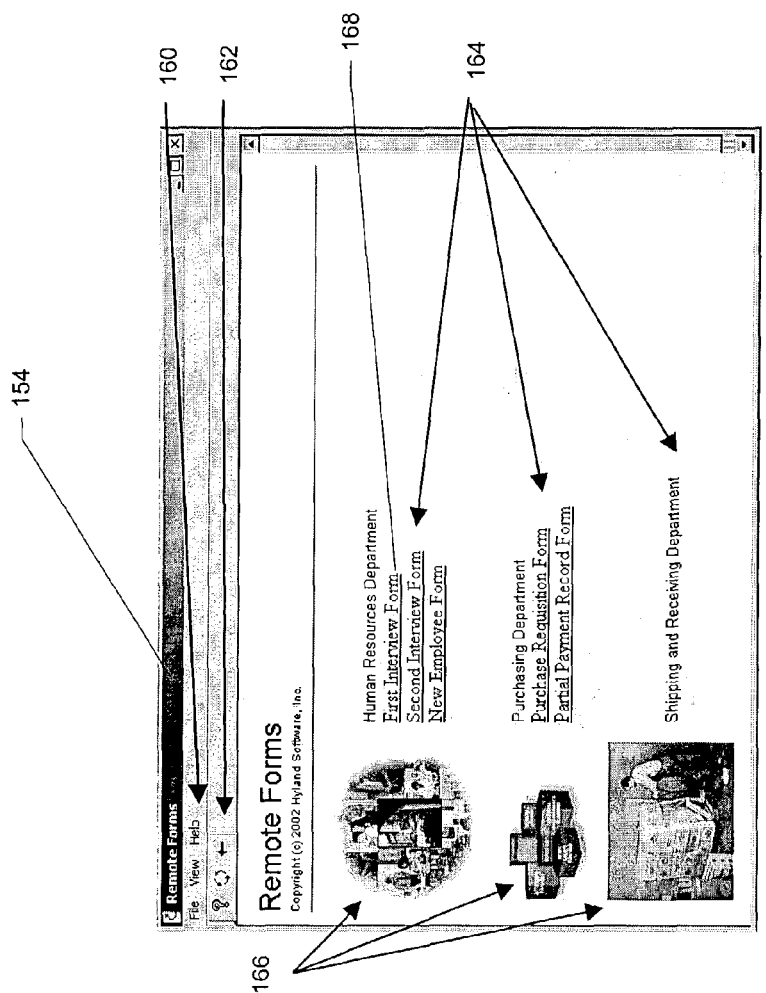

FIG. 4 shows a more detailed remote forms manager screen 154. The remote forms manager screen 154 includes such areas as: task bar 160, tool bar 162, available forms area 164, and group icons 166. The task bar 160 appears at the uppermost portion of the main menu. It has three main tasks (File, View and Help), each with their respective drop-down menu of functions as described in the following table:

| Task | Function | Description |
| --- | --- | --- |
| File | Add | Allows for addition of an Icon Group or Available Form to the main menu. |
|  | Go Back | Returns the main menu display to the previous display screen. |
|  | Synchronize | Initiates the downloading of forms to the database. |
|  | Exit | Ends operation of the Forms Manager. |
| View | Toolbar | Toggles the display of the toolbar in the main menu. |
| Help | About | Displays information about the Forms Manager software version. |

The tool bar 162 appears below the task bar 160 and has a synchronize button, an about button, and a back button. The synchronize button is used when the laptop is connected to the home network, via a LAN/WAN or Internet connection. Once a proper connection has been established, selecting synchronize initiates the process of downloading the completed forms to the document management system's central database. The about button accesses an "About the Remote Forms" message box. The back button returns the display to the previous display screen.

The available forms area 164 lists electronic forms that can be accessed by the user. Subsets of these forms can be grouped together and represented by an icon for easy identification. Clicking on a form name hyperlink causes that form to be displayed. The icon area 166 is a display-only area, used to graphically represent groups of available forms.

Figure 5:
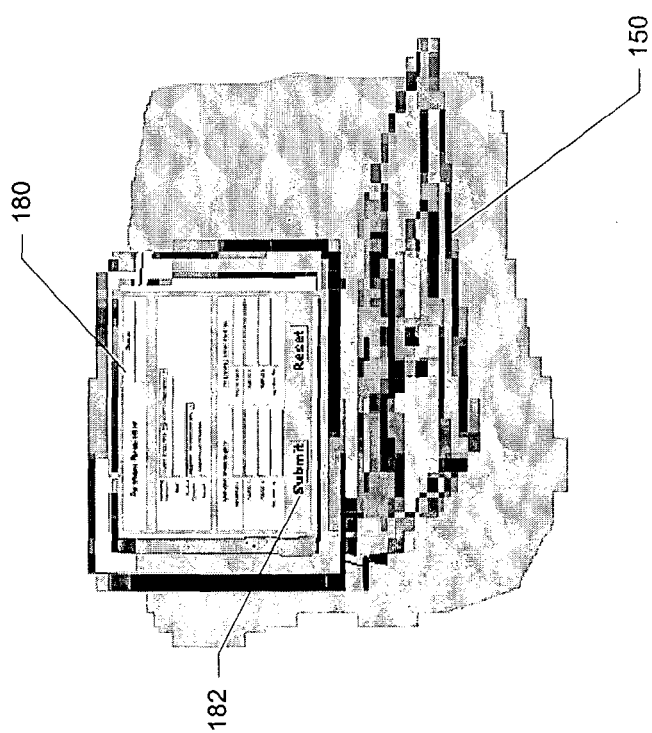

To enter data on a form, a user clicks on the name of a form (e.g., form name 168) on the remote forms manager screen 154. As shown on FIG. 5, the selected form 180 appears on the display, overwriting or being tiled with respect to the main menu. The user positions the cursor in the appropriate fields and enters the required data. When the form 180 is complete, the user selects the submit button 182. Optionally after the form 180 has been submitted, it is stored locally on the laptop as an .htm file and cannot be reaccessed/modified by the remote forms manager. Any changes to the form or future requests to access the form may be done after the form has been transferred and resides in the central database.

To connect to a document management system's database and transfer all completed forms, a user follows the central server's guidelines for connecting the user's personal computer to the network. When the remote forms manager main menu appears, the user selects the synchronize button. All forms that have been saved locally are transferred to the central database. If a form has not been properly configured, or if inconsistencies exist between the form and the central database, an error message is displayed, and the form will not be transferred. The form will reside locally on the laptop until it is manually deleted, using the delete function provided via the operating system.

The synchronize function copies the form and its associated data from the "Completed Forms" folder in the local remote forms manager folder hierarchy to the data management system's remote central database in either of two ways: Internet or LAN/WAN. Synchronization over the Internet is accomplished via standard web browsers such as Internet Explorer and Navigator to relay completed forms to the central database. Synchronization over a LAN/WAN is accomplished once the laptop is connected to the LAN/WAN in which the document imaging system resides, using the communications protocol of that LAN/WAN.

Figure 6:
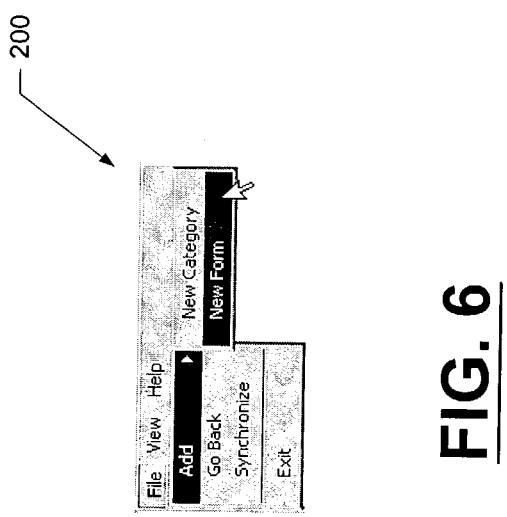
FIGS. 6 and 7 are graphical user interfaces involved in the addition of a form.

To add forms (and if necessary, a new group icon) to the forms manager main menu, a user selects "File" at the remote forms manager task bar 160. At the drop-down list, the user selects the "Add" and "New Form" options as shown at 200 in FIG. 6.

Figure 7:
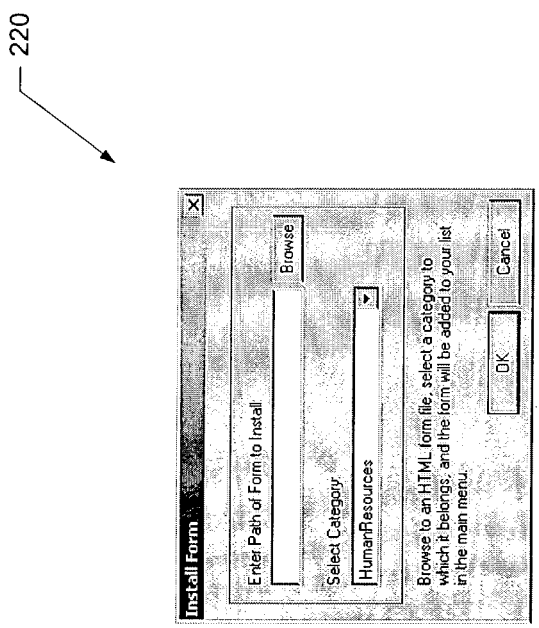

At the "Install Forms" dialog box shown at 220 in FIG. 7, the user enters parameters for the new form. The user indicates the Group Icon under which the form will appear by making the appropriate selection at the "Select Category" drop-down list. (If none of the available categories are satisfactory, a new category can be created for the storage of forms using the "New Category" function.) The user selects the "Browse" option to navigate to and then select the form. The path will appear in the "Enter Path of Form to Install" text field. When all parameters are satisfactory, the user selects the "OK" option. (The "Cancel" option can be used at any time to exit the installation of the form and return to the remote forms manager main menu.)

Figure 8:
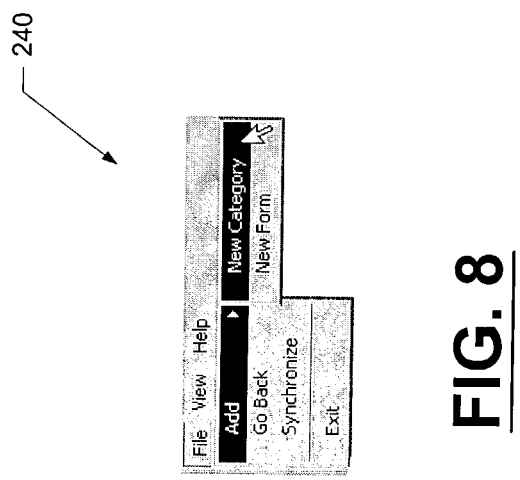
FIGS. 8 and 9 are graphical user interfaces involved in the creation of new categories for forms.
Figure 9:
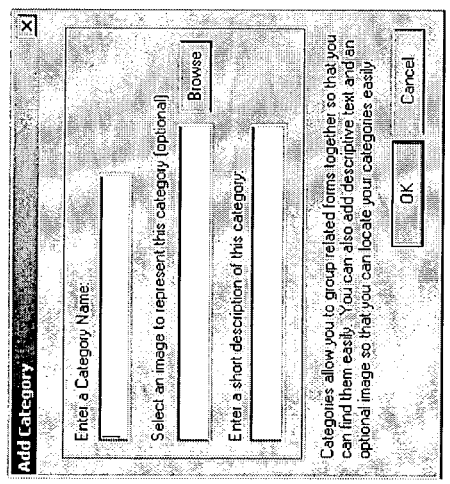

To add a new category, the user selects the "File" option as shown at 240 on FIG. 8. At the drop-down list, the user selects the "Add" option, then selects the "New Category" option. At the "Add Category" dialog box shown at 260 on FIG. 9, the user enters parameters for the new category. The user types a name in the "Enter a Category Name" field that will be used to create a folder for the new forms. This name will not appear on the main menu, but will be used by the program to store any forms created for the category.

The user selects the "Browse" option to navigate to and then select an image that will appear as the Icon for the new category at the remote forms manager main menu. The path will appear in the "Select an image to represent this category (optional)" text field. The user indicates the name that will appear for the category at the remote forms manager main menu by typing that text in the "Enter a short description of this category" field. When all parameters are satisfactory, the "OK" option is selected. (Cancel can be used at any time to exit the creation of the category and return to the remote forms manager main menu.)

Figure 10A:
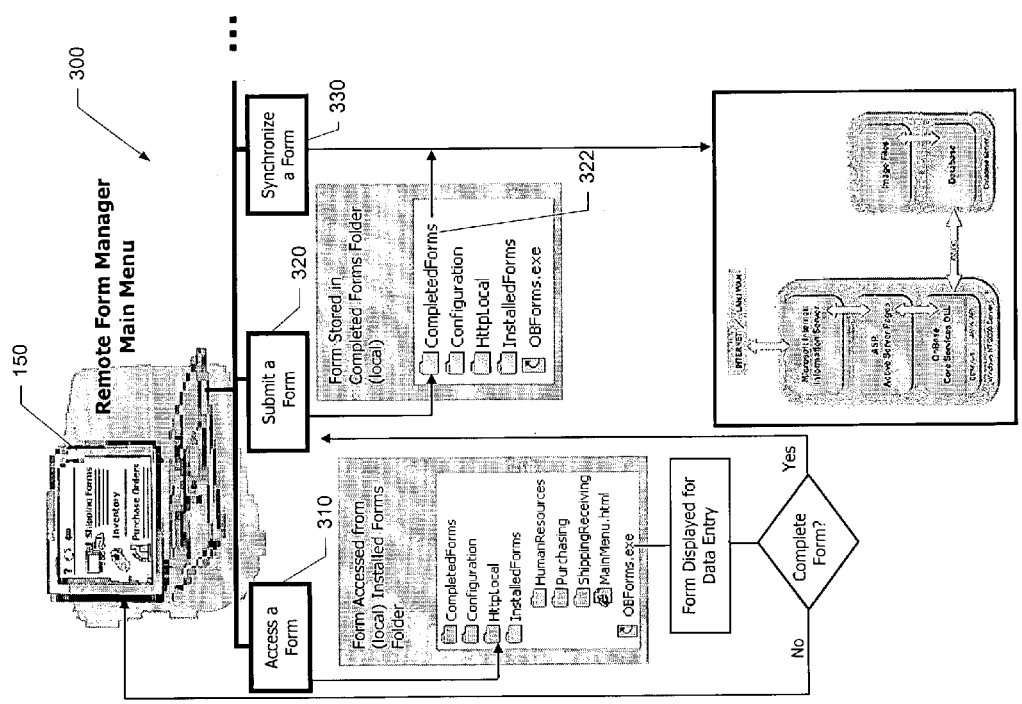
FIGS. 10A and 10B are flowcharts depicting operations available from a remote form manager main menu.
Figure 10B:
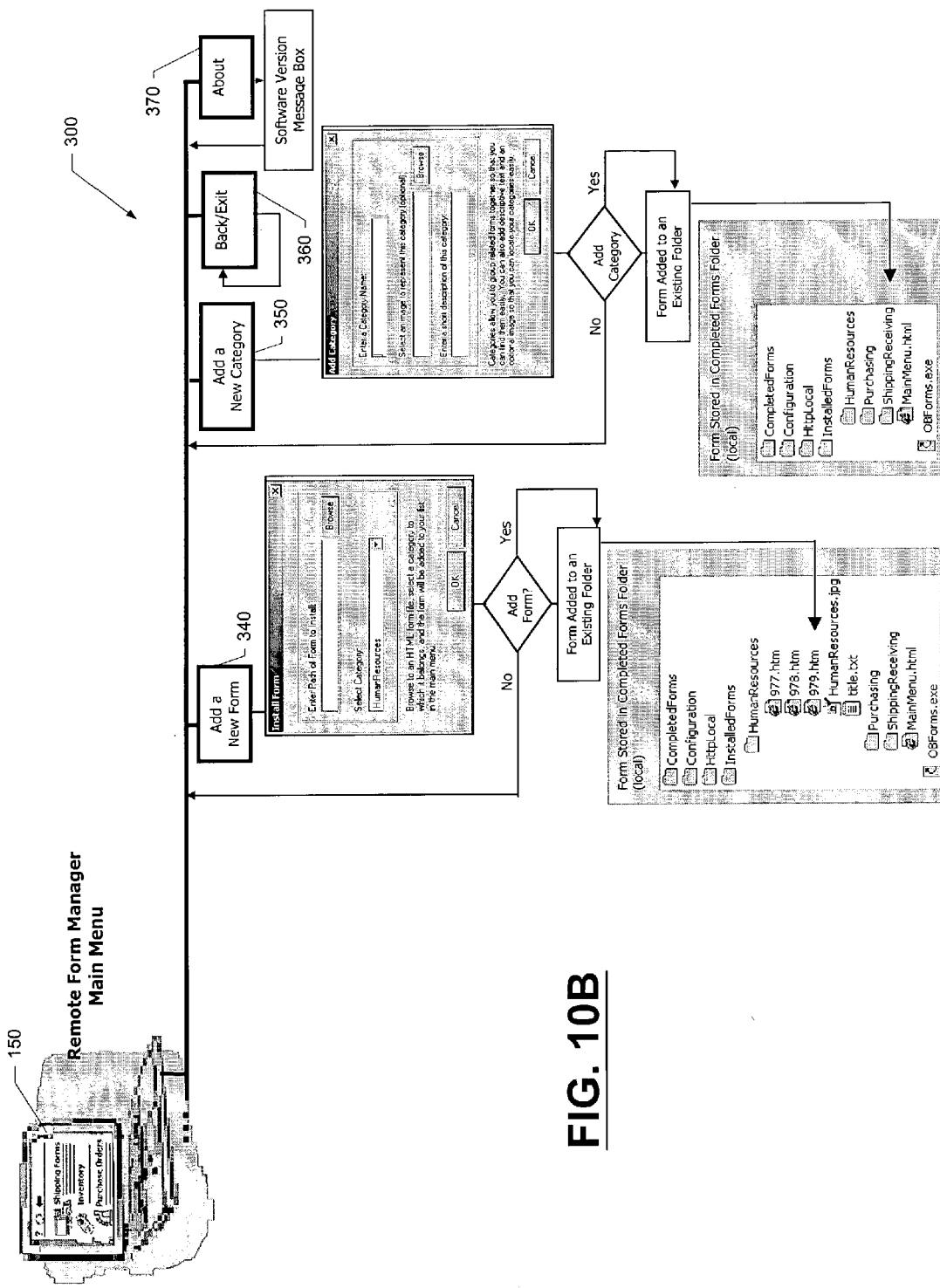

FIGS. 10A and 10B summarize the processing flow 300 among the various operations described above—that is, the form access operation 310, form submission operation 320, form synchronization operation 330, add a new form operation 340, add a new category operation 350, the back/exit operation 360, and the about operation 370. The various folder locations are also provided where applicable for the operations. For example, the form submission operation 320 involves the storing of a form in the "CompletedForms" directory 322 on the local personal computer. It should be understood that there are many variations for storing submitted forms.

The mobile forms system may include an electronic forms module which provides a user with the ability to complete and submit online HTML forms that can be automatically indexed and stored as system documents. Electronic forms help reduce paper documents by allowing a user to create documents from within the system. Forms are often used in conjunction with a workflow solution, where they are routed through a business process.

Electronic forms can be created outside of the system with an HTML text editor and imported into a document management system's client program. If a system administrator has already configured forms, a user can create new forms through the electronic forms module. If the user is incorporating a form into a system for the first time, the user can create and properly configure the form.

Figure 11:
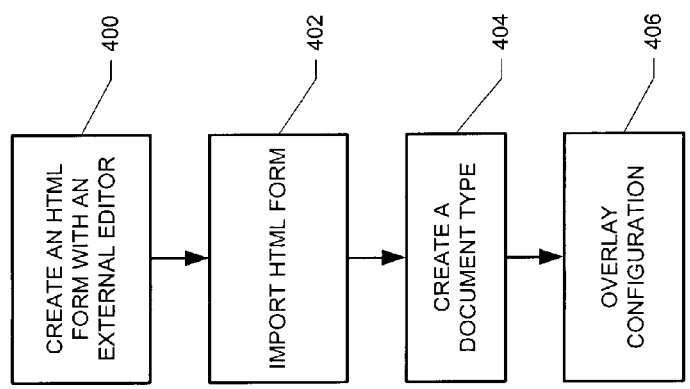
FIG. 11 is a flow chart showing steps involved in a form configuration process.

FIG. 11 shows a form configuration process. At process block 400, a use creates an HTML form with an external editor. Electronic forms are written in HTML. The user can write HTML code directly or use an HTML editor such as FrontPage, which allows the user to preview form layouts.

The variety of available text editors gives the user flexibility in form coding. Electronic forms may contain input fields that are mapped to document keyword types and other system values. Electronic forms can also contain information that is not mapped to keywords or stored in the database, such as text entered in a scroll box. This information is stored with the form and is available for viewing.

Figure 12:
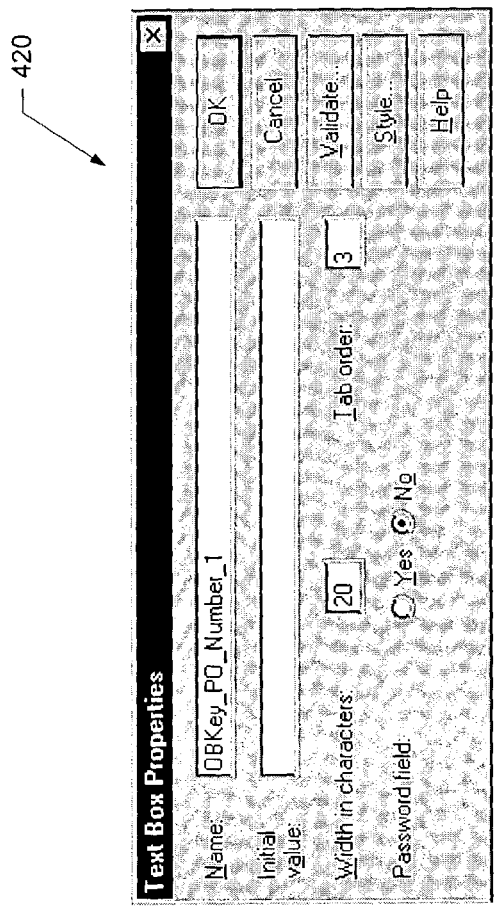
FIG. 12 is a graphical user interface involved in identifying keyword types and system values.

Information entered, into properly configured input fields will be saved as keyword values or system values on the electronic form. The way in which the user identifies keyword types and system values in the HTML form may be dependent on the choice of HTML editor. In the example shown at 420 in FIG. 12, the map code for the keyword type PO Number is configured in FrontPage. When the form is complete, it is saved as an .htm file.

The user can map keyword types as follows: by mapping the form field to a keyword type name or by mapping the form field to the keyword type number.

The following format is used to map the form field to a keyword type name:
Format: OBKey_Keyword_Type Name#
where:

| | |
|---|---|
| OBKey_ | Every keyword value that is mapped starts with the document management system code OBKey_. |
| Keyword_Type_Name | The keyword type to which the field is mapped. The keyword type name matches the keyword type name configured in the system. Map codes are case sensitive. The keyword type name appears in the map with underscores rather than spaces. For example, the keyword type PO Number is mapped as PO_Number. |
| # | The last piece of the map represents the number of occurrences of the keyword on the form. For example, the first use of the keyword PO Number would be mapped as PO_Number_1, the second occurrence would be mapped as PO_Number_2, etc. |

The second way to map the form field to the keyword type is by using the keyword type number. The keyword type number is displayed on the upper right hand corner of the keyword type configuration screen. This number is assigned to the keyword type when the keyword type is created. In the keyword type configuration screen example below, the customer name field could be replaced with OBKey__110__1. Note that when using the keyword type number, two underscores precede the keyword value number. Only one underscore is used with Keyword Type Name mapping. Also note that keyword type number mapping is particularly helpful when keyword types contain characters that are not accepted by HTML.

Input fields on the electronic form can be used to update system information stored in the database. Mapping system properties to form fields is similar to mapping keyword values. The user can map form fields to system properties via radio buttons, edit fields, combo boxes, check boxes and select lists. These input fields can use special tags to identify system information.

When a check box is selected on a system form, the value associated with that check box in the HTML code is stored as a system property or keyword value. When a value is stored, documents can be searched based on the keyword, just as if the keyword had been entered in a field.

The following specialized tags are available when creating an HTML document for use as an electronic form, such as the following system properties:

| System Properties | Description |
|---|---|
| OBDocumentDate | Updates the document date. |
| OBFromDate | Used by Custom Queries to restrict the date range |
| OBToDate | of the search. |

The following document properties can be stored automatically on a form. These values cannot be changed by the E-Form user.

| Document Properties |
|---|
| OBProperty_DocumentDate |
| OBProperty_DateStored |
| OBProperty_TimeStored |
| OBProperty_UserName |
| OBProperty_ItemNum |

Note that If both OBDocumentDate and OBProperty_DocumentDate are used on the same form, if the value stored for OBDocumentDate is changed, the value stored for OBProperty_DocumentDate is also changed to the new value.

The following provides examples of buttons that can be used on an electronic form:

| Button | Description |
|---|---|
| OBBtn_CrossReference | Selecting a button of this type will cause a properly configured cross-reference to execute. A keyword cross-reference can be set up between the electronic form and the related document. This button can be type=submit. |
| OBBtn_Keyset | Selecting a button of this type causes all keyword sets on the electronic form to be expanded (when one or more AutoFill keyword sets are properly configured and populated). This button can be type=submit.<br>When a primary keyword is entered on the form and the OBBtn_Keyset button is pushed, the corresponding keyword values are stored for the document.<br>When a user populates Keyword types that have not been mapped to form fields, the keyword values do not automatically display on the form. To view a form's keyword values, right-click on the form in a document search results list and choose Keywords. |
| OBBtn_KS### (Where ### represents an Autofill Keyword set number) | Selecting a button of this type causes the specified keyword set on the electronic form to be expanded, when an AutoFill keyword set is properly configured and populated. This button can be type=submit.<br>When a primary keyword is entered on the form and the OBBtn_KS### button is pushed, the corresponding keyword values for the specified keyword set are stored for the document. For example, pressing a button mapped as OBBtn_KS101 populates the autofill keyword set 101.<br>In these examples, ### represents an AutoFill Keyword set number. Each AutoFill Keyword set is identified by a number in the database. By default, this number is displayed in the upper right corner of the AutoFill Keywords Configuration dialog box. To view the number associated with an AutoFill Keyword set, select the Keywords drop-down menu in the configuration program, select AutoFill Keyword Sets, and click on the AutoFill Keyword Set you wish to identify. The number is displayed in the upper right hand corner of the dialog box.<br>When a user populates Keyword types that have not been mapped to form fields, the keyword values do not automatically display on the form. To view a form's keyword values, right-click on the form in a document search results list and choose Keywords. |
| OBBtn_Yes | |
| OBBtn_Save | Saves information to the database. |
| OBBtn_xRefItemnum | Retrieve a document based on database item number associated with the value. The keyword in the database must be named xRefItemnum. |

The next step in the form configuration process (shown in FIG. 11 at 402) is to import the HTML form. To use an electronic form in the document management system, it is imported through the client program. The HTML form is stored into the system SYS HTML Forms document type as a basic template, or overlay. The form will not change once it has been imported.

To import the electronic form, the user opens the "Import Document" dialog box, selects the "File" menu from the client program and "clicks Import." In the Full Path to File text box the user enters the location of the HTML form or clicks "Browse" to search for it. The user selects the "Delete File After Import" check box if the user would like to delete the file from an external file manager after it is imported.

"From the Document Type" drop-down list, the user selects "SYS HTML Forms" document type. This allows the form to be placed into the system as an overlay template to be used repeatedly. When the document type has been selected, the "File Type" and "Document Date" text boxes are filled in automatically.

In the "Keywords" section, the user types a description of the HTML form into the "Description" text box. Once the "Import Document" dialog box has been completely filled out, the "Import" is clicked to store the HTML form into the "SYS HTML Forms" document type. Once an HTML form has been imported into the system, it can be applied to a document type.

The next step in the form configuration process (shown in FIG. 11 at 404) is to create a document type. Like documents, forms can be associated with a document type. Before the user imports an HTML form, an appropriate document type is created in the configuration program. An HTML form is associated with the document type by clicking the "EForm" option from the "Document Type" configuration dialog box. An HTML form is selected from the drop-down menu, which displays all documents of the "SYS HTML Forms" document type.

Note that some HTML editors will not store text entries including the character "&" in a way that is correctly stored in the database. For example, the entry "Shipping & Receiving" may be stored as "Shipping & Receiving" in the HTML code. In this case, a search for the keyword value "Shipping & Receiving" would not return expected results. Some HTML editors store extra spaces as " ", which can cause the maximum length of the keyword value to be exceeded or produce unexpected search results.

The next step in the form configuration process (shown in FIG. 11 at 406) is to overlay the configuration. To assign an HTML form to a document type, the user selects the "Document" menu of the configuration program and clicks "Document Types." The electronic form document type is highlighted and "EForm" option is clicked. The user selects the form from the "Electronic Form" drop-down list, and clicks "Save & Close" to add the form to the document type.

The following illustrates a way in which the form data may be transferred from a personal computer to a central computer. Form data may be stored on the remote PC in a single data file, or in separate data files for each form post. Optionally, the data for each post is stored in a separate file. These files may be transferred to the central web server individually, or may be bundled prior to sending to the central web server.

The mobile forms application employs a method for bundling multiple files into a single data stream. This stream is posted to the central web server, which then unbundles the stream into separate files that can be archived into the system. This method does not require multiple round-trip connections to the central server. There are several steps to the encoding/decoding process which are as follows. The mobile forms application opens each completed form file on the user's machine, and converts the binary data within into an ASCII string. This conversion takes place by converting each byte of the binary file into a two-byte sequence of hexadecimal characters. This is done because normal HTTP Post strings do not contain special characters.

Figure 13:
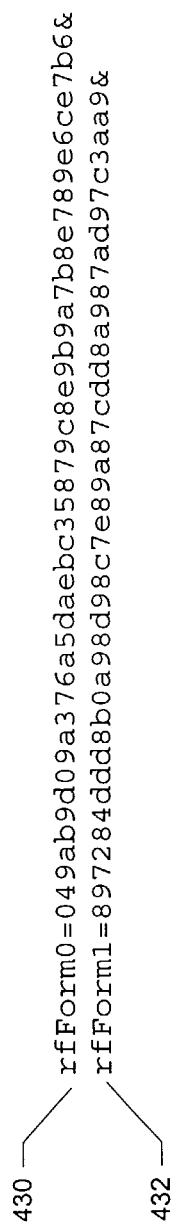
FIG. 13 shows HTTP post requests involved in uploading forms to a central server.

A single HTTP Post Request is composed using the list of ASCII strings. The post essentially contains a list of name/value pairs in which the name is a generated sequence string and the value is the ASCII string itself. In the example shown in FIG. 13, two forms have been converted. The two entries 430 and 432 are separated by '&' characters (per the standard for HTTP Posts).

The post request composed is then sent to the central server via a standard HTTP request. The server essentially performs the steps described above in reverse, first converting each ASCII encoded string back into a binary data file, and then archiving each of those files into the document management system.

The server responds to the mobile forms application with a single message indicating the upload status of each form. The application is able to safely remove its local copies of the forms when it receives acknowledgement that they have been properly archived.

Figure 14:
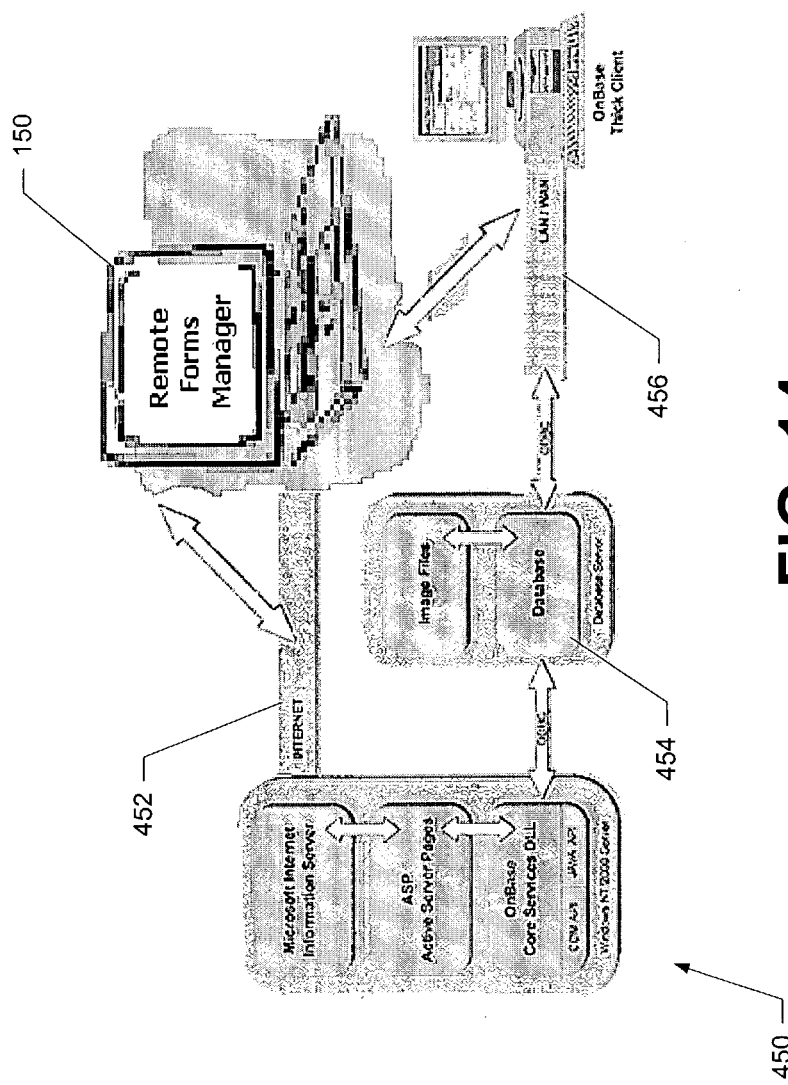
FIG. 14 is a block diagram showing an example of interaction between a document management system and a mobile forms system.

While examples have been used to disclose a mobile forms system, including the best mode, and also to enable any person skilled in the art to make and use the invention, the patentable scope of the invention is defined by the claims, and may include other examples that occur to those skilled in the art. For example many software, network, and document management system environments may be used with the mobile forms system. One such example is shown in FIG. 14. The remote forms manager on a personal computer 150 allows users with a way to relay any information usually supplied to a document management system 450 via a form, from any remote location. This is accomplished via the synchronize function described above. The synchronize function uses standard web browsers such as Internet Explorer and Navigator to relay completed forms over an Internet connection 452 to the central database 454, or can relay the forms to the document management system 450 once the laptop has been physically connected to a local area network (LAN) or wide area network (WAN) 456.

As another alternative, standard web browsers function as secure thin-clients in both Internet and Intranet environments for most client operating systems. An ActiveX or Java viewer control (as available from Hyland Software, Inc.) provides more advanced user features over the Internet. To minimize network bandwidth consumption, the ActiveX and Java viewers are intelligently cached on the browser client workstation to eliminate repeated downloading. New control and applet downloads will only occur if deployed by the system administrator.

The remote forms manger may be provided as an N-tier application in order to provide true platform-neutral access to existing document management system electronic form repositories with backward compatibility with existing forms, security, user group, database, and file storage configurations. Form managers can be deployed on multiple computers intended for remote form processing. The form managers can connect to one or more different hardware servers, including generic, inexpensive, web server appliances. The form managers connect to an HS running on Microsoft Windows NT/2000. Communications may be performed using standard Internet network protocols that are compatible with SSL and VPN secure connections.

A large number of servers may be used within the mobile forms system. On some platforms, the following conditions should be considered:

Within the <FORM> subsection of the <BODY> section, these fields may be added:

<INPUT type="hidden" name="OBProperty_ItemNum"value="">

<INPUT type="hidden" name="OBDocumentType" value="yourDocumentTypeValue">

Where: "yourDocumentTypeValue" is the Document Type # value displayed for that document, the user may type in the Document Types dialog box in the configuration program. A text editor, like Notepad, may be used to edit and save the revised file as plain text.

To further illustrate the wide variations of the mobile forms system, many different installation procedures may be used. For example after an administrator has set up and configured the document management web server, the administrator can configure the upload URL for the remote forms application. In an ASP (application service provider) implementation, administrators may choose to place a document management system's ASP pages into a virtual directory on their site's Internet Information Server. For example in the OnBase application from Hyland Software, Inc., webdms may be as follows:

http://www.yourcompany.com/webdms

The ASP pages for uploading exist in a subdirectory entitled 'RemoteForms'. Thus, the upload URL would be:

http://www.yourcompany.com/webdms/RemoteForms

Due to the stateless nature of the synchronization process, the administrator may alter the "RemoteFormsVars.asp" file to include the name of the system's ODBC data source as follows:

| | |
|---|---|
| 1. | <% |
| 2. | dim g_strDataSourceName |
| 3. | ' The default data source name. |
| 4. | ' |
| 5. | g_strDataSourceName = "OBSERVER" |
| 6. | %> |

The administrator enters the name of the data source inside the quotation marks, and saves the changes. Next, the administrator installs the remote forms manager application on a personal computer, by copying the remote forms folder to the computer that will be storing and submitting forms.

The invention claimed is:

1. A computer-implemented method for processing forms on a personal computer while isolated from a computer server which has a document management system, comprising the steps of:
   storing Hypertext Markup Language (HTML) forms on the personal computer wherein the forms have data fields for data submission;
   receiving data as input to at least one first data field on a first HTML form while the personal computer is physically disconnected from the computer server;
   receiving a data submit command with respect to the first HTML form field input data;
   storing the first HTML form field input data on the personal computer in response to the received data submit command;
   wherein the HTML form field input data is stored in a first file on the personal computer in response to the received data submit command;
   after the personal computer is connected to a network having a data connection to the document management system,
      identifying second completed HTML forms including the first HTML form in response to a user command, second HTML form field input data associated with the second completed HTML forms being stored on the personal computer in second files;
      using a graphical user interface to indicate that the second HTML form field input data are to be sent from the second files on the personal computer to the document management system;
      converting each of the second files from a binary format into a character string;
      combining the character strings corresponding to the second files into a single data stream;
      sending the single data stream over the network to the document management system;
   wherein after being successfully sent to the document management system, the first HTML form and the stored first HTML form field input data are removed from the personal computer;
   wherein the document management system facilitates electronic capturing of documents and for storing and managing the documents.

2. The method of claim 1 wherein the forms are business forms.

3. The method of claim 1 wherein the personal computer is a laptop computer.

4. The method of claim 1 wherein the personal computer is a notebook computer.

5. The method of claim 1 wherein the personal computer is a hand-held computer.

6. The method of claim 1 wherein a remote forms manager screen is used by a user to access the HTML forms on the personal computer.

7. The method of claim 1 wherein at least several of the forms are grouped together and represented by an icon.

8. The method of claim 1 wherein the storing of the HTML form field data on the personal computer includes collecting the entered data and saving the entered data to a self-contained file on the personal computer.

9. The method of claim 1 wherein the storing of the HTML form field data on the personal computer includes collecting the entered data and saving the entered data to an HTML file on the personal computer.

10. The method of claim 1 wherein if the first HTML form and the stored HTML form field input data are not successfully sent to the document management system, the first HTML form and the stored HTML form field input data remain on the personal computer.

11. The method of claim 1 wherein if the stored HTML form field input data is successfully transferred to the document management system, then the HTML form field input data is removed from the personal computer.

12. The method of claim 11 wherein if the stored HTML form field input data is not successfully transferred to the document management system while the personal computer is connected to the network, then the HTML form field input data is not removed from the personal computer.

13. The method of claim 9 wherein the entered data includes HTML post data.

14. The method of claim 13 wherein the data for each post is stored in a separate file.

15. The method of claim 14 wherein the separate files are HTML files.

16. The method of claim 15 wherein at least one of the separate files represents a business document.

17. A computer-implemented system for processing forms on a personal computer while isolated from a computer server which has a document management system, comprising:
   a data storage device on the personal computer that stores Hypertext Markup Language (HTML) forms, wherein the forms have data fields for data submission;
   a data processor configured to store the first HTML form field input data, associated with a first HTML form, on the personal computer in response to a received data submit command, wherein the first HTML form field input data is stored in a first file on the personal computer in response to the received data submit command, wherein the storage of the first HTML form field input data in an HTML format occurs while the personal computer is physically disconnected from the computer server and includes HTML post data,
   the data processor being further configured, after the personal computer is connected to a network having a data connection to the document management system, to identify second completed HTML forms including the first HTML form in response to a user command, second HTML form field input data associated with the second completed HTML forms being stored on the personal computer in second files;
   a graphical user interface configured to be displayed on a display device, in response to the personal computer being connected to the network, the graphical user interface being used to indicate that the second HTML form field input data are to be sent from the second files on the personal computer to the document management system;
   wherein the data processor is further configure to convert each of the second files from a binary format into a character string, combine the character strings corresponding to the second files into a single data stream, and send the single data stream over the network to the document management system;
   wherein after being successfully sent to the document management system, the first HTML form and the stored first HTML form field input data are removed from the personal computer;
   wherein the document management system facilitates electronic capturing of documents and for storing and managing the documents.

* * * * *